(12) United States Patent
Henriksen, Jr.

(10) Patent No.: US 8,434,982 B2
(45) Date of Patent: May 7, 2013

(54) ENCAPSULATED FASTENER ASSEMBLY

(75) Inventor: Arne Henriksen, Jr., Algonquin, IL (US)

(73) Assignee: Engineered Components Company, Elgin, IL (US)

( * ) Notice: Subject to any disclaimer, the term of this patent is extended or adjusted under 35 U.S.C. 154(b) by 290 days.

(21) Appl. No.: 12/942,601

(22) Filed: Nov. 9, 2010

(65) Prior Publication Data

US 2012/0114447 A1    May 10, 2012

(51) Int. Cl.
 *F16B 21/00* (2006.01)
(52) U.S. Cl.
 USPC .......................................... 411/338; 411/377
(58) Field of Classification Search .................. 411/438,
    411/373, 372.5, 372.6, 429–431, 338, 178
    See application file for complete search history.

(56) References Cited

U.S. PATENT DOCUMENTS

| 73,088 | A |  | 1/1868 | Gardner |  |
|---|---|---|---|---|---|
| 563,969 | A |  | 7/1896 | Kempshall |  |
| 1,867,354 | A |  | 7/1932 | Dickson |  |
| 1,941,175 | A |  | 12/1933 | Johnson |  |
| 3,134,290 | A |  | 5/1964 | Jentoft |  |
| 3,470,787 | A |  | 10/1969 | Mackie |  |
| 3,693,495 | A |  | 9/1972 | Wagner |  |
| 4,293,243 | A |  | 10/1981 | Graybeal et al. |  |
| 4,316,690 | A |  | 2/1982 | Voller |  |
| 4,373,842 | A |  | 2/1983 | Bettini et al. |  |
| 4,482,278 | A |  | 11/1984 | Dorn |  |
| 4,490,083 | A | * | 12/1984 | Rebish | 411/338 |
| 5,244,326 | A | * | 9/1993 | Henriksen | 411/180 |
| 5,290,131 | A | * | 3/1994 | Henriksen | 411/180 |
| 5,454,676 | A | * | 10/1995 | Conte | 411/339 |
| 6,012,763 | A | * | 1/2000 | Clemente et al. | 296/186.4 |

* cited by examiner

*Primary Examiner* — Gary Estremsky
(74) *Attorney, Agent, or Firm* — Greer, Burns & Crain Ltd.

(57) ABSTRACT

A fastener assembly including an internally threaded nut and an externally threaded screw for securing at least two materials together. A combined thickness TM of the materials is less than a length SL of the screw inserted into the materials. The nut includes a head, a shank extending from the head, and an internally threaded bore extending into the shank. The screw includes a head and an externally threaded shank adapted to threadingly engage the internally threaded bore of the nut. An encapsulating plastic layer covers the head of the nut. The plastic layer extends under and covers a bottom surface of the head. The plastic layer has a thickness TE below the bottom surface of the head which is equal to or greater than a difference between the screw length SL and the material thickness TM.

20 Claims, 3 Drawing Sheets

ENCAPSULATED FASTENER ASSEMBLY

BACKGROUND OF THE INVENTION

The present invention relates to a fastener assembly, and in particular to a fastener assembly including a nut with an enlarged head and an internally threaded shank with an encapsulating plastic layer protecting the enlarged head of the nut. An externally threaded screw is received in the internally threaded shank of the nut.

It is known in the art to encapsulate fasteners with some type of a plastic covering. Such covered heads are disclosed in U.S. Pat. Nos. 73,088; 563,969; 1,941,175; 1,867,354; 3,470,787; 3,693,495 and 4,293,243. Other types of covered heads are disclosed in U.S. Pat. Nos. 3,134,290; 4,316,690; 4,373,842; and 4,482,278. An encapsulated head, barbed shank fastener is disclosed in U.S. Pat. No. 5,244,326, the disclosure of which is incorporated herein in its entirety. A closed-end ridged neck threaded fastener is disclosed in U.S. Pat. No. 5,244,326, the disclosure of which is incorporated herein in its entirety.

Fastener assemblies including a nut with an enlarged encapsulated head have an internally threaded shank comprising a blind hole. The screw is threaded into the blind hole to secure the two fastener parts together and to clamp the fastened pieces together.

In some uses of encapsulated fastener assemblies, such as in the construction of wall panels for truck bodies, stronger, lighter and thinner materials are being used which have been posing problems for existing fasteners. As the panels and extrusions to be joined together become thinner, their combined thickness becomes smaller than the length of the screw of the fastener assembly, which has a predetermined minimum length due to fabrication limitations. This causes the screw to protrude through the surface of the materials being joined. When this occurs, the screw cannot be tightened completely into the nut because the screw bottoms out on the bottom of the blind hole in the nut before the head of the nut and the head of the screw tightly clamp the plies of the panels together.

A solution of using washers or other spacers under the head of the nut to hold the head of the nut away from the surface that the screw protrudes through not only increases the parts costs, but also the labor time and cost for assembly. Further, the use of washers or spacers can reduce the effectiveness of the liquid seal provided by the encapsulating head of the nut.

Consequently, it can be seen that the need exists for a fastener assembly that can provide an encapsulated head for a nut and yet be used in a thin wall assembly.

SUMMARY OF THE INVENTION

In an embodiment, the present invention provides a fastener assembly including an externally threaded screw and an internally threaded nut for use in securing at least two materials together, wherein a combined thickness TM of the at least two materials is less than a length SL of a portion of the screw inserted into the two materials. The screw has an externally threaded shank and an enlarged head. The nut has a shank with a blind hole therein. The blind hole is internally threaded to threadingly receive the externally threaded shank of the screw. The nut has an enlarged head on an end of the shank opposite from an end with an opening of the blind hole. An encapsulating plastic layer is provided on the enlarged head of the nut covering a top side of the head and an underside of the head and surrounding a portion of the shank of the nut. The encapsulating plastic layer has a thickness TE on the underside of the head which is equal to or greater than a difference between the screw length SL and the material thickness TM.

In an embodiment, the present invention provides that an underside of the encapsulating plastic layer has two sealing areas, an annular outer lip and an annular inner lip, each of the lips radially extending away from a planar surface of the encapsulating plastic layer. The outer lip is formed to extend radially outwardly when the fastener assembly is secured in place. The inner lip is formed to extend radially inwardly when the fastener assembly is secured in place. The planar surface extends uninterrupted between the outer lip and the inner lip to form a single annular space between the inner and outer lips bounded by the planar surface and the fastening surface.

In an embodiment, the present invention provides a fastener assembly including an internally threaded first fastener and an externally threaded second fastener for use in securing at least two materials together, wherein a combined thickness TM of the at least two materials is less than a length SL of a portion of the second fastener inserted into the two materials. The first fastener includes a head portion, a generally cylindrical shank portion extending from the head portion, the shank portion having a longitudinal axis, and an internally threaded longitudinal bore extending into the shank portion. The second fastener includes a head portion and an externally threaded shank portion extending from the head portion and adapted to threadingly engage the internally threaded bore of the first fastener. An encapsulating plastic layer covers the head of the first fastener. The plastic layer extends under and covers a bottom surface of the head. The plastic layer has a thickness TE below the bottom surface of the head which is equal to or greater than a difference between the second fastener length SL and the material thickness TM.

In an embodiment, the first fastener includes an anti-rotation configuration which may be in the form of a plurality of longitudinal ridges disposed on at least part of a length of an outer surface of the shank portion extending in a direction generally parallel to the longitudinal axis of the shank portion.

In an embodiment, the second fastener head is adapted to receive a driving tool for rotationally driving the second fastener.

In an embodiment, the present invention provides a fastener assembly including an externally threaded screw and an internally threaded nut for use in securing at least two materials together, wherein a combined thickness TM of the at least two materials is less than a length SL of a portion of the screw inserted into the two materials. The screw has an externally threaded shank and an enlarged countersunk and undercut head. The nut has a shank with a blind hole therein, the blind hole being internally threaded to threadingly receive the externally threaded shank of the screw. The shank of the nut has a plurality of longitudinal ridges disposed on at least part of a length of an outer surface of the shank extending in a direction generally parallel to the longitudinal axis of the shank. The nut has an enlarged head on an end of the shank opposite from an end with an opening of the blind hole. An encapsulating plastic layer on the enlarged head of the nut covers a top side of the head and an underside of the head and surrounds a portion of the shank of the nut. The encapsulating plastic layer has a thickness TE on the underside of the head which is equal to or greater than a difference between the screw length SL and the material thickness TM. The longitudinal ridges extend along a portion of the shank of the nut which is not surrounded by the encapsulating plastic layer.

In an embodiment, the longitudinal ridges extend along a portion of the shank of the nut and terminate short of the end of the nut with the opening of the blind hole.

In an embodiment, the longitudinal ridges extending along a portion of the shank of the nut and having an exposed length not surrounded by the plastic of at least 0.135 inches.

In an embodiment, a depth of the blind hole is at least 0.300 inches.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DETAILED DESCRIPTION OF THE PREFERRED EMBODIMENTS

Figure 1:
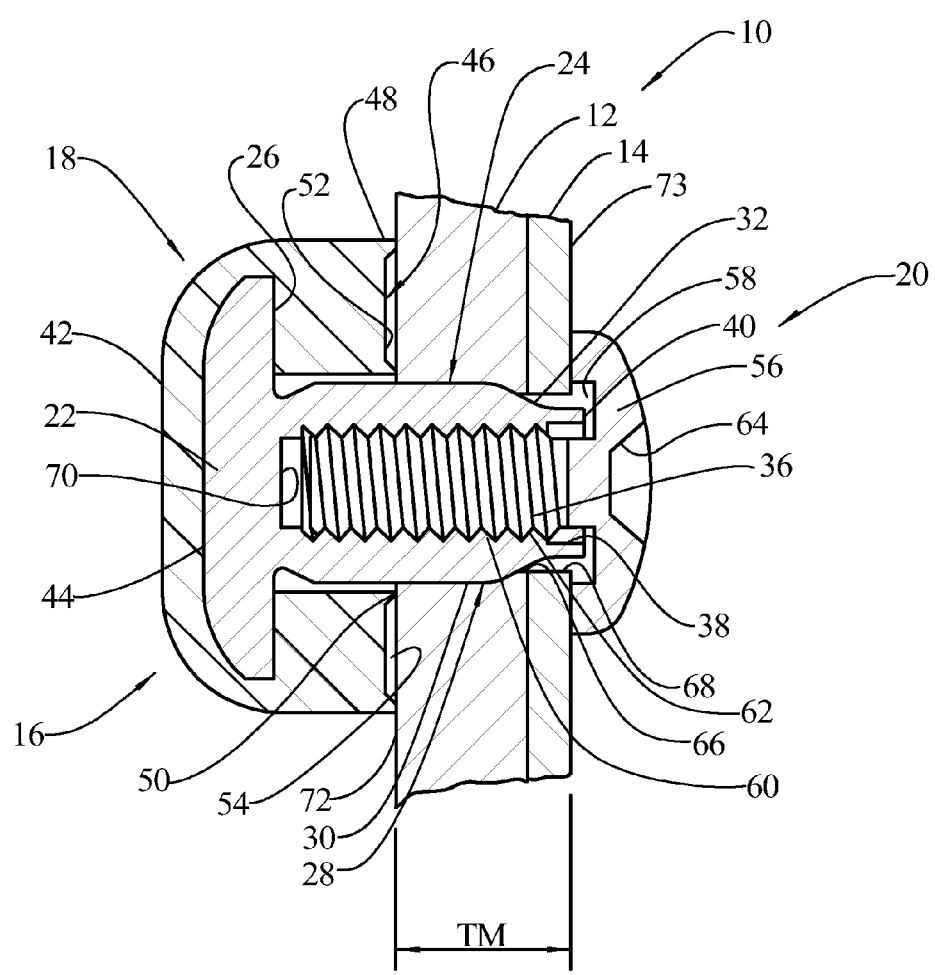
FIG. 1 is a cross-sectional view of a two component structure showing the encapsulated fastener assembly in place.

FIG. 1 illustrates a portion of a structure 10 (such as a container, portable shelter or truck body) in which a material forming a first structural component 12 such as a wall panel is secured to a second structural component 14 such as an extrusion by means of a plurality of fastener assemblies 16. Although only two layers of structural components are shown, any number of two or greater structural components may be secured together with the fastener assembly 16 of the present invention.

Figure 2:
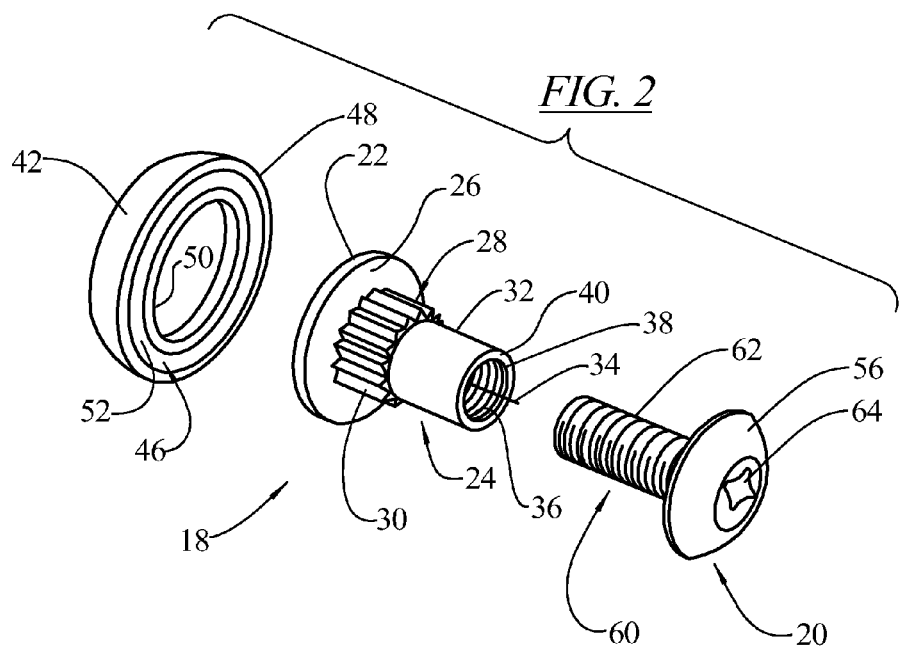
FIG. 2 is a perspective view of a disassembled encapsulated fastener assembly.

As shown in FIGS. 1 and 2, each of the fastener assemblies 16 includes a first fastener member 18 and a second fastener member 20. The first fastener member 18 may be in the form of a T-nut which includes a generally disc-shaped head portion 22. A generally cylindrical shank portion or post 24 is secured to, and extends from, an underside 26 of the head portion 22. The shank portion 24 may be provided with an anti-rotation structure 28 in the form of a plurality of longitudinal ridges 30. The longitudinal ridges 30 are formed on a portion of the length of an outer peripheral surface 32 of the shank portion 24, and extend generally parallel to a longitudinal axis 34 of the shank portion 24. The longitudinal ridges 30 have a constant height along their entire length.

Figure 3:
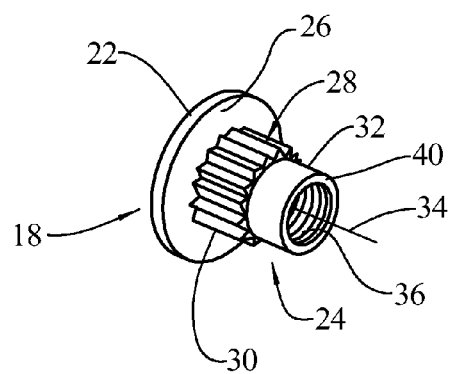
FIG. 3 is a perspective view of an alternate embodiment of the nut portion of the fastener assembly of FIG. 2.

The shank portion 24 is provided with an internally threaded longitudinal bore 36 comprising a blind hole with an opening 38 at a free end 40 opposite the head portion 22. The outer peripheral surface 32 of the shank portion 24 near the end 40 has a smooth cylindrical shape with an outer diameter smaller than a width dimension of the anti-rotation structure 28. The head portion 22 is covered by an encapsulating plastic layer 42 which covers a top side 44 of the head portion and the underside 26 of the head portion and surrounds a portion of the shank portion 24. In some embodiments of the first fastening member 18, the outer peripheral surface 32 of the shank portion 24 extends longitudinally beyond the ridges 30 a relatively greater distance (as shown in FIG. 2) than the longitudinal extent of the outer peripheral surface 32 beyond the ridges 30 in other embodiments (as shown in FIG. 3). The embodiment as shown in FIG. 3 is most useful when the thickness of the materials 12, 14 being secured is thinner than the relatively greater thicknesses where the embodiment shown in FIG. 2 is most useful.

An underside 46 of the encapsulating plastic layer 42 has two sealing areas, an outer annular lip 48 and an inner annular lip 50 which extends down slightly further than the outer lip 48. The outer lip 48 is formed to extend radially outwardly when the fastener assembly 16 is secured in place. The inner lip 50 is formed to extend radially inwardly when the fastener assembly 16 is secured in place. A planar surface 52 extends between the two annular lips 48, 50. When the fastener assembly 16 is tightened into position, the outer lip 48 is pushed radially downwardly and outwardly. When the fastener assembly 16 is tightened into position, the inner lip 50 is pushed downwardly and inwardly (toward the first fastening member shank portion 24). When the fastener is secured in place, a small space 54 is left between the encapsulating layer 42 and the first structural component 12.

The second fastener member 20, which may be a screw, is provided with a truss head portion 56 that may be undercut as at 58, and from which extends a generally cylindrical shank portion 60. The use of a truss head portion 56 is important in assemblies where thinner gauge material is being secured. The use of a countersunk headed screw is important to have a relatively flush and smooth surface on the exposed side of the second structural component 14. In other situations the head portion 56 may be of other types, such as round head, pan head, etc. The shank portion 60 is provided with external threads 62 that may extend along the entire length of the shank portion 60, and is adapted to threadingly engage with the internal bore 36 of the first fastener member 18. An outer side of the head portion 56 of the second fastener member 20 may be provided with a recessed portion 64 that is adapted to receive a tool for rotationally driving the second fastener member. The recessed portion 64 as shown is adapted to receive a TORX® driving tool, but it is contemplated that the head portion 56 can be adapted or shaped to receive any suitable driving tool, such as a screwdriver, allen wrench or socket wrench.

Figure 5:
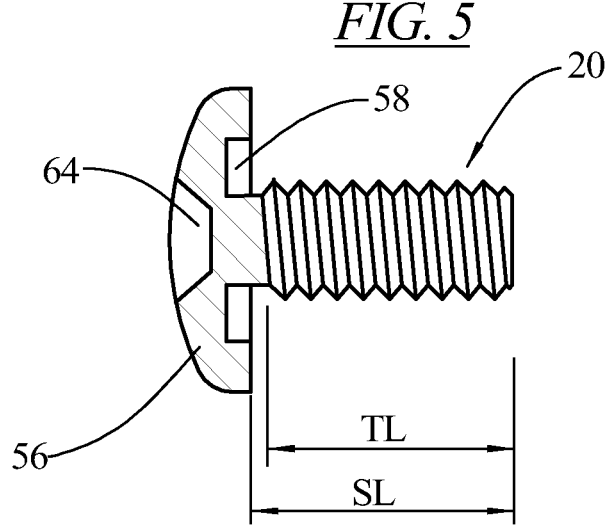
FIG. 5 is a side sectional view of the screw portion of the fastener assembly.

The second fastener member 20 typically has its external threads 62 formed in a cold rolling procedure which requires that the second fastener member have a threaded length TL (FIG. 5) that extends into the material 12, 14 to be secured of a least a predetermined minimum, generally about 0.230 to 0.250 inches. Forming screws of this type typically cannot be done for a length shorter than this 0.230 to 0.250 inches.

In operation, the first fastener member 18 is inserted into a bore 66 in the structural component 12, as shown in FIG. 1. The bore 66 has a diameter that is slightly less than the diameter of the anti-rotational structure 28. The longitudinal ridges 30 frictionally engage the inner surface of the bore 66. The smooth cylindrical shape of the outer peripheral surface 32 of the shank portion 24 is smaller in diameter than the bore 66, allowing the first fastener member 18 to be easily inserted into the bore.

After the first fastener member 18 has been inserted into the first structural component 12, the second fastener member 20 is then inserted through an aligned bore 68 in the second structural component 14, and a driving tool is used to rotationally drive the second fastener member 20, thus causing the threaded shank portion 60 of the second fastener member to threadingly engage the threaded inner bore 36 of the first fastener member 18. The frictional engagement of the anti-rotation structure 28 with the inner surface of the bore 68 prevents rotational movement of the first fastener members 18 with respect to the bore 68 of the first structural component 12.

The triangular configuration of the longitudinal ridges 30 (see FIG. 2) also allows the first fastener members 18 to be non-destructively removed from the first structural component 12 upon application of a significant axial force. This advantage is particularly important in applications where disassembly and reassembly are required, such as in containers and portable shelters.

In assemblies of first 12 and second 14 (or more) structural components, where the components are relatively thin, such that an inserted length SL (FIG. 5) of the second fastener member 20 is greater than a combined thickness TM of the first and second (or more) structural components, the second fastener member 20 would bottom out against a bottom wall 70 of the blind hole 36, thereby preventing a complete tightening of the first 18 and second 20 fastener members together. Also, the encapsulating plastic layer 42 on the underside 26 of the head portion 22 of the first fastener member 18 would not be pulled into a tight seal against the first structural component 12. For example, with second fastener member 20 limited to a minimum threaded length of 0.230 inches, the combined thickness TM of the structural components of less than about 0.250 inches would result in this premature bottoming out of the second fastener member in the first fastener member.

Figure 4:
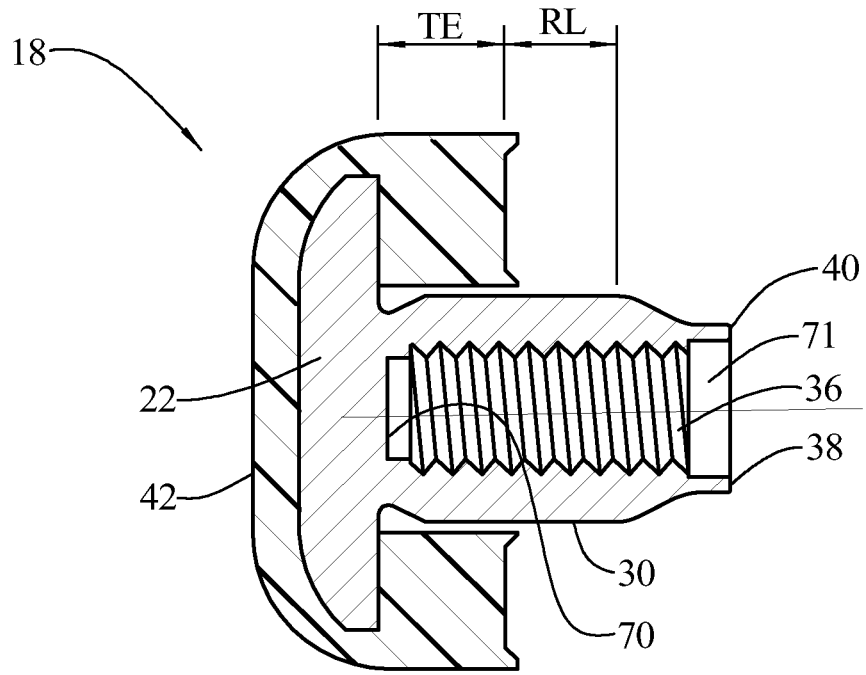
FIG. 4 is a side sectional view of the nut portion of the fastener assembly.

To address and overcome this problem, a thickness TE (FIG. 4) of the encapsulating plastic layer 42 on the underside 26 of the head portion 22 of the first fastener member 18 is increased such that the bottom wall 70 of the blind hole 36 will be held at an elevated position above a surface 72 of the first structural member 12 by at least as much as the second fastener member 20 is exposed beyond the surface 72 of the first structural component 12. The encapsulating plastic layer 42 on the underside 26 of the head portion 22 of the first fastener member 18 also surrounds the ridges 30 on the shank portion 24, but it is important that the ridges 30 remain exposed beyond the encapsulating layer 42 so that a sufficient length RL of the ridges 30 will remain exposed to engage the walls of the bores 66, 68 in the structural components 12, 14, to prevent rotation of the first fastener member 18 as it is engaged and tightened to the second fastener member 20. It has been determined that an exposed length RL of at least 0.135 inches must be provided for the ridges 30.

The undercut area 58 of the head portion 56 of the second fastener member 20 may be provided to allow the end 40 of the first fastener member 18 to move as close as possible to the head portion 56 of the second fastener member 20, to minimize an overall length of the combined fasteners and to increase an engaged length of the internal threads of the bore 36 of the first fastener member 18 with the external threads 62 of the second fastener member 20. When an undercut second fastener 20 is used, the first 1½ to 2 threads of the T-nut fastener 18 are removed, as at 71 (FIG. 4), to allow the second fastener to be fully received within the T-nut.

As shown in FIG. 1, the second fastener member 20 is not quite fully engaged in the first fastener member 18. The threaded end of the second fastener member 20 is positioned slightly away from the bottom wall 70 of the first fastener member 18. When the second fastener member 20 is completely tightened to the first fastener member 18, the head 56 of the second fastener member will be snug with the surface 73 and the end 40 of the first fastener member will be located in the undercut area 58 of the second fastener member. In an embodiment, the length of the first fastening member 18 has been reduced to between 0.310 and 0.330 inches. This will provide a grip length between the first fastener member and the second fastener member of at least about 0.200 inches. A depth of the blind hole 36 from the end 40 to the bottom wall 70 of at least about 0.300 inches will provide the minimum grip length required to assure a secure holding between the first fastener member and the second fastener member.

In this manner, a fastener assembly 16 is provided including an externally threaded screw 20 and an internally threaded nut 18 for use in securing at least two materials 12, 14 together, wherein the combined thickness TM of the at least two materials is less than the length SL of a portion of the screw 20 inserted into the two materials. The encapsulating plastic layer 42 has the thickness TE on the underside 26 of the head portion 24 which is equal to or greater than a difference between the inserted screw length SL and the material thickness TM.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A fastener assembly including an externally threaded screw and an internally threaded nut in combination with at least two materials secured together by the fastener assembly, comprising:

said screw having an enlarged head and an externally threaded shank with a length SL extending from said enlarged head, a combined thickness TM of the at least two materials being less than the length SL of said screw, said nut having a shank with a blind hole therein, said blind hole being internally threaded to threadingly receive said externally threaded shank of said screw, said shank having an anti-rotation structure thereon, said nut having an enlarged head on an end of said shank opposite from an end with an opening of said blind hole, an encapsulating plastic layer on said enlarged head of said nut covering a top side of said head and an underside of said head and surrounding a portion of said shank of said nut, said encapsulating plastic layer surrounding a portion, but not all, of said anti-rotation structure, said encapsulating plastic layer having a thickness TE on said underside of said head which is equal to or greater than a difference between said screw length SL and the material combined thickness TM.

2. A fastener assembly according to claim 1, wherein an underside of said encapsulating plastic layer has two sealing areas, an annular outer lip and an annular inner lip, each of said lips radially extending away from a planar surface of said encapsulating plastic layer;

said outer lip being formed to extend radially outwardly when said fastener assembly is secured in place; and said inner lip being formed to extend radially inwardly when said fastener assembly is secured in place;

said planar surface extending uninterrupted between said outer lip and said inner lip to form a single annular space between said inner and outer lips bounded by said planar surface and said fastening surface.

3. A fastener assembly according to claim 1, wherein said externally threaded shank portion comprises threads disposed along an entire length of said shank portion.

4. The fastener assembly according to claim 1, wherein said nut includes a plurality of longitudinal ridges disposed on at least part of a length of an outer surface of said shank portion extending in a direction generally parallel to said longitudinal axis of said shank portion.

5. The fastener assembly according to claim 4, wherein said longitudinal ridges extend along a portion of said shank of said nut and terminate short of said end of said nut with said opening of said blind hole.

6. The fastener assembly according to claim 4, wherein said longitudinal ridges extend along a portion of said shank of said nut and have an exposed length not surrounded by said plastic of at least 0.135 inches.

7. The fastener assembly according to claim 1, wherein a depth of said blind hole is at least 0.300 inches.

8. A fastener assembly including an internally threaded first fastener and an externally threaded second fastener comprising:
said first fastener including a head portion, a generally cylindrical shank portion extending from said head portion, said shank portion having an anti-rotation structure thereon, said shank portion having a longitudinal axis, and an internally threaded longitudinal bore extending into said shank portion;
said second fastener including a head portion, an externally threaded shank portion extending from said head portion and adapted to threadingly engage said internally threaded bore of said first fastener;
an encapsulating plastic layer covering said head of said first fastener;
said encapsulating plastic layer extending under and covering a bottom surface of said head;
said encapsulating plastic layer surrounding a portion, but not all, of said anti-rotation structure.

9. A fastener assembly according to claim 8, wherein said first fastener is a T-nut and said second fastener is a screw.

10. A fastener assembly according to claim 8, wherein an underside of said encapsulating plastic layer has two sealing areas, an annular outer lip and an annular inner lip, each of said lips radially extending away from a planar surface of said encapsulating plastic layer;
said outer lip being formed to extend radially outwardly when said fastener assembly is secured in place; and
said inner lip being formed to extend radially inwardly when said fastener assembly is secured in place;
said planar surface extending uninterrupted between said outer lip and said inner lip to form a single annular space between said inner and outer lips bounded by said planar surface and said fastening surface.

11. A fastener assembly according to claim 8, wherein said internally threaded longitudinal bore of said first fastener member comprises a blind bore.

12. A fastener assembly according to claim 8, wherein said externally threaded shank portion comprises threads disposed along an entire length of said shank portion.

13. The fastener assembly according to claim 8, wherein said first fastener includes a plurality of longitudinal ridges disposed on at least part of a length of an outer surface of said shank portion extending in a direction generally parallel to said longitudinal axis of said shank portion.

14. The fastener assembly according to claim 13, wherein said longitudinal ridges extend along a portion of said shank of said nut and terminate short of said end of said nut with said opening of said blind hole.

15. The fastener assembly according to claim 13, wherein said longitudinal ridges extend along a portion of said shank of said nut and have an exposed length not surrounded by said plastic of at least 0.135 inches.

16. The fastener assembly according to claim 11, wherein a depth of said blind hole is at least 0.300 inches.

17. A fastener assembly including an externally threaded screw and an internally threaded nut in combination with at least two materials secured together, comprising:
said screw having an enlarged countersunk and undercut head and an externally threaded shank with a length SL extending from said enlarged head,
a combined thickness TM of the at least two materials being less than the length SL of said screw,
said nut having a shank with a blind hole therein, said blind hole being internally threaded to threadingly receive said externally threaded shank of said screw,
said shank of said nut having a plurality of longitudinal ridges disposed on at least part of a length of an outer surface of said shank extending in a direction generally parallel to said longitudinal axis of said shank,
said nut having an enlarged head on an end of said shank opposite from an end with an opening of said blind hole,
an encapsulating plastic layer on said enlarged head of said nut covering a top side of said head and an underside of said head and surrounding a portion of said shank of said nut,
said encapsulating plastic layer surrounding a portion of said longitudinal ridges,
said encapsulating plastic layer having a thickness TE on said underside of said head which is equal to or greater than a difference between said screw length SL and the material combined thickness TM,
said longitudinal ridges extending along a portion of said shank of said nut which is not surrounded by said encapsulating plastic layer.

18. The fastener assembly according to claim 17, wherein said longitudinal ridges extend along a portion of said shank of said nut and terminate short of said end of said nut with said opening of said blind hole.

19. The fastener assembly according to claim 17, wherein said longitudinal ridges extending along a portion of said shank of said nut and having an exposed length not surrounded by said plastic of at least 0.135 inches.

20. The fastener assembly according to claim 17, wherein a depth of said blind hole is at least 0.300 inches.

* * * * *